(12) United States Patent
Vargas

(10) Patent No.: US 8,118,121 B2
(45) Date of Patent: Feb. 21, 2012

(54) RECHARGEABLE AUTOMOBILE ELECTRIC POWER SYSTEM CONFIGURED TO REPLACE THE UNPOWERED REAR AXLE OF A FRONT WHEEL DRIVE VEHICLE

(75) Inventor: Joseph Vargas, Reno, NV (US)

(73) Assignee: Edak, LLC, Reno, NV (US)

( * ) Notice: Subject to any disclaimer, the term of this patent is extended or adjusted under 35 U.S.C. 154(b) by 773 days.

(21) Appl. No.: 12/147,437

(22) Filed: Jun. 26, 2008

(65) Prior Publication Data
US 2009/0321155 A1   Dec. 31, 2009

(51) Int. Cl.
*B60K 6/20* (2007.10)
(52) U.S. Cl. ................ 180/65.24; 180/65.275
(58) Field of Classification Search ........ 180/56, 180/62, 65.1, 65.21, 65.22, 65.26, 65.275, 180/65.285, 65.31, 65.51, 65.6, 65.8, 165, 180/291; 29/401.1; 903/906
See application file for complete search history.

(56) References Cited

U.S. PATENT DOCUMENTS

| | | | | |
|---|---|---|---|---|
| 4,270,622 A * | 6/1981 | Travis | ............ | 180/65.31 |
| 4,807,716 A * | 2/1989 | Hawkins | ............ | 180/65.1 |
| 4,928,227 A * | 5/1990 | Burba et al. | ............ | 701/66 |
| 5,105,517 A * | 4/1992 | Barnow | ............ | 29/401.1 |
| 5,215,156 A * | 6/1993 | Stulbach et al. | ............ | 180/65.31 |
| 5,327,987 A * | 7/1994 | Abdelmalek | ............ | 180/65.25 |
| 5,429,204 A * | 7/1995 | Tuholski | ............ | 180/247 |
| 5,562,178 A * | 10/1996 | Worden et al. | ............ | 180/291 |
| 5,632,351 A * | 5/1997 | Ishiyama | ............ | 180/65.1 |
| 5,662,185 A * | 9/1997 | Mackiewicz | ............ | 180/65.6 |
| 5,689,174 A * | 11/1997 | Pacheco, Sr. | ............ | 322/16 |
| 6,378,638 B1 * | 4/2002 | Mizon et al. | ............ | 180/65.6 |
| 6,423,894 B1 * | 7/2002 | Patz et al. | ............ | 136/244 |
| 6,889,126 B2 * | 5/2005 | Komiyama et al. | ............ | 701/22 |
| 6,923,277 B2 * | 8/2005 | Lin | ............ | 180/2.2 |
| 6,978,853 B2 * | 12/2005 | Bennett | ............ | 180/65.1 |
| 7,028,583 B2 * | 4/2006 | Bennett | ............ | 74/661 |
| 7,134,517 B1 * | 11/2006 | Kaiser et al. | ............ | 180/65.6 |
| 7,325,638 B1 * | 2/2008 | Belloso et al. | ............ | 180/69.6 |
| 7,363,995 B2 * | 4/2008 | Downs et al. | ............ | 180/65.1 |
| 7,445,067 B2 * | 11/2008 | Marsh et al. | ............ | 180/65.51 |
| 7,628,236 B1 * | 12/2009 | Brown | ............ | 180/65.21 |
| 7,658,391 B1 * | 2/2010 | Wurm | ............ | 280/80.1 |
| 7,681,676 B2 * | 3/2010 | Kydd | ............ | 180/65.21 |
| 7,717,203 B2 * | 5/2010 | Yoshino et al. | ............ | 180/65.51 |
| 2006/0000650 A1 * | 1/2006 | Hughey | ............ | 180/65.2 |
| 2006/0026957 A1 * | 2/2006 | Hauser et al. | ............ | 60/487 |
| 2006/0030450 A1 * | 2/2006 | Kyle | ............ | 477/3 |
| 2006/0054368 A1 * | 3/2006 | Varela | ............ | 180/65.5 |
| 2006/0108161 A1 * | 5/2006 | Feliss et al. | ............ | 180/65.2 |
| 2006/0108866 A1 * | 5/2006 | Hunter | ............ | 303/152 |
| 2006/0281598 A1 * | 12/2006 | Petruska et al. | ............ | 475/230 |
| 2007/0006579 A1 * | 1/2007 | Takada et al. | ............ | 60/444 |
| 2007/0069586 A1 * | 3/2007 | Queveau et al. | ............ | 307/66 |
| 2008/0011531 A1 * | 1/2008 | Cole | ............ | 180/65.5 |
| 2008/0053726 A1 * | 3/2008 | Marsh et al. | ............ | 180/65.5 |
| 2008/0223633 A1 * | 9/2008 | Kim | ............ | 180/65.2 |
| 2008/0236910 A1 * | 10/2008 | Kejha et al. | ............ | 180/65.2 |
| 2009/0024267 A1 * | 1/2009 | Kawai | ............ | 701/22 |

(Continued)

*Primary Examiner* — J. Allen Shriver, II
*Assistant Examiner* — Brodie Follman

(57) ABSTRACT

A rechargeable automobile electric power system and method modifying a front-wheel drive automobile through installation of the system is disclosed. The system is designed as a unit meant to replace the rear axle of a front-wheel drive vehicle. The system comprises: an axle assembly configured to replace the existing unpowered rear axle of a front-wheel drive automobile, an electric motor powered by rechargeable batteries which drives the axle assembly.

2 Claims, 2 Drawing Sheets

U.S. PATENT DOCUMENTS

| | | | |
|---|---|---|---|
| 2009/0166106 A1* | 7/2009 | Batdorf | 180/24.06 |
| 2009/0242289 A1* | 10/2009 | Murty | 180/65.265 |
| 2009/0294188 A1* | 12/2009 | Cole | 180/65.1 |
| 2009/0321155 A1* | 12/2009 | Vargas | 180/62 |
| 2010/0012402 A1* | 1/2010 | Vargas | 180/62 |
| 2010/0044129 A1* | 2/2010 | Kyle | 180/65.25 |
| 2010/0193269 A1* | 8/2010 | Fuchtner et al. | 180/65.22 |
| 2010/0224430 A1* | 9/2010 | Bennett, Sr. et al. | 180/65.51 |
| 2011/0000721 A1* | 1/2011 | Hassett et al. | 180/65.22 |
| 2011/0079454 A1* | 4/2011 | Maguire et al. | 180/65.25 |
| 2011/0094806 A1* | 4/2011 | Mack et al. | 180/65.6 |
| 2011/0094807 A1* | 4/2011 | Pruitt et al. | 180/65.6 |

* cited by examiner

RECHARGEABLE AUTOMOBILE ELECTRIC POWER SYSTEM CONFIGURED TO REPLACE THE UNPOWERED REAR AXLE OF A FRONT WHEEL DRIVE VEHICLE

FIELD OF THE INVENTION

The present invention relates generally to drive systems and methods for hybrid electric and fuel driven automobiles. More particularly, the present invention relates to a system and method for installing an electric drive system on the rear axle of a front-wheel drive automobile.

BACKGROUND

Gasoline prices have recently soared to all-time highs. With the surge in demand coming from China, India, and other parts of the developing world, prices are unlikely to come down anytime soon. Gasoline has reached more than $4.00 per gallon in much of the United States and some analysts estimate that prices could reach $7.00 per gallon or more by the end of the year. These sky-high gas prices are putting a huge strain on many people and have emphasized the continuing need for technologies that would make automobiles more fuel-efficient.

One development in this regard has been hybrid vehicles. A hybrid vehicle is a vehicle that uses two or more distinct power sources to propel the vehicle. The most popular hybrid vehicles now combine an internal combustion engine power source with an electric motor power source. The latest hybrid technology is the Plug-in Hybrid Electric Vehicle (PHEV). The PHEV consists of a gasoline-electric hybrid whose battery pack is upgraded to a larger capacity, which can be recharged by either a battery charger hooked into the electrical grid or the gasoline engine. The car runs on battery power for the first approximately 10 to 60 miles, with the gasoline engine available for faster acceleration, etc. After the battery is nearly discharged, the car reverts to the gasoline engine to recharge the battery and/or return the car to the charging station. This hybrid design helped to ameliorate the fundamental obstacle of battery range that has made nearly all pure electric cars impractical. However, hybrid cars are expensive. It is not clear yet whether purchasing a new hybrid car will ever pay for itself in fuel savings. Consumers who own a hybrid vehicle may purchase less gas and have lower maintenance expenses than if they owned the non-hybrid counterpart, and may qualify for a federal tax credit designated for hybrid vehicle owners. However, most hybrids high sales prices, insurance costs and related expenses will offset the savings. A recent study by Edmunds found that during the first five years of ownership, a hybrid can cost as much as $5,283 more than its non-hybrid counterpart. Therefore, there exists an unfilled need for a system and method capable cost-effectively adding an electric drive component to an existing internal combustion engine powered automobile.

SUMMARY OF ONE EMBODIMENT OF THE INVENTION

Advantages of One or More Embodiments of the Present Invention

The various embodiments of the present invention may, but do not necessarily, achieve one or more of the following advantages:

The ability to cost-effectively increase the fuel-efficiency of an existing front-wheel drive automobile;

The ability to convert a front-wheel drive automobile to a modified hybrid vehicle.

The ability to convert a front-wheel drive automobile into a modified 4-wheel drive automobile.

These and other advantages may be realized by reference to the remaining portions of the specification, claims, and abstract.

Brief Description of One Embodiment of the Present Invention

In one embodiment, the invention comprises a rechargeable automobile electric power system. The system is designed as a unit meant to replace the rear axle of a front-wheel drive vehicle. The system comprises: an axle assembly configured to replace the existing unpowered rear axle of a front-wheel drive automobile. It also includes an electric motor and one or more rechargeable batteries configured to supply power to the electric motor. The electric motor is further configured to drive at least one of the rear wheels of the front-wheel drive automobile.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

Figure 1:
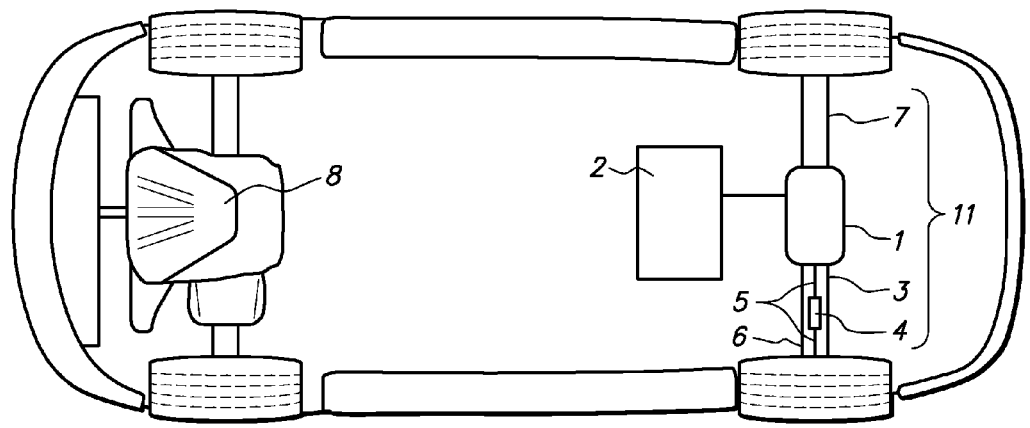
FIG. 1 is substantially a top view of one embodiment of the present invention.
Figure 2:
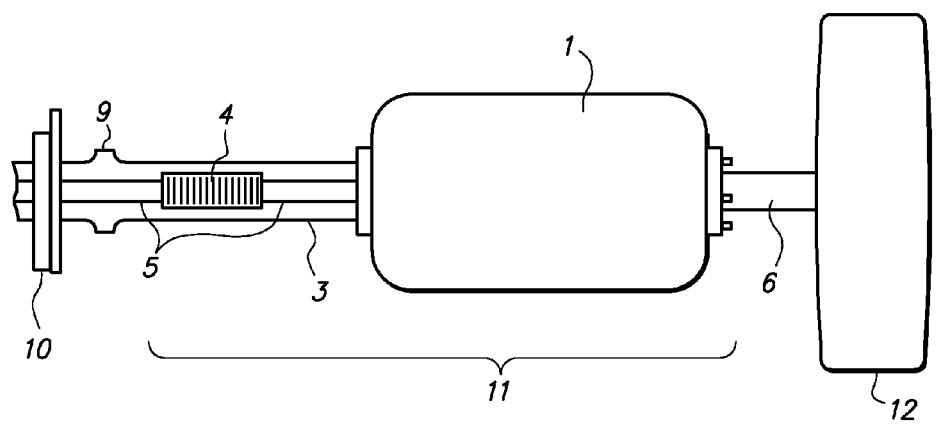
FIG. 2 is substantially close up view of one embodiment of the invention.
Figure 3:
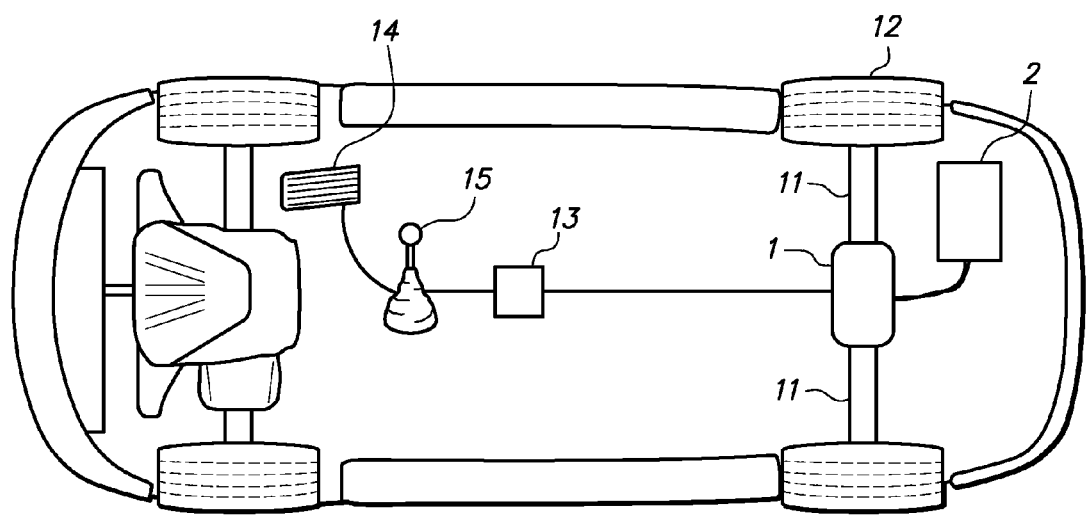
FIG. 3 is substantially a top view of one embodiment of the invention including a switching mechanism.

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

The following is a listing of the reference numbers included in the original drawings and the element that each reference number corresponds to and a brief description:

1. Electric Motor. Many variations on size and horse power would be operable in accordance with the present invention.

2. One or More Rechargeable Batteries. These may vary in size, shape, location, configuration and power.
3. Axle Housing. This is a section of metal that supports the axle and the wheel hub allowing the electric motor drive axle 5 to turn freely.
4. Axle Sleeve. This sleeve connects the electric motor drive axle 5 and the wheel axle 6 together. In two-wheel drive embodiments this Axle Sleeve 4 can be replaced by a clutch.
5. Drive Axle. This may also be referred to as an armature axle. This is the axle powered by the electric motor 1.
6. Wheel Axle. This connects to the drive axle 5 and turns the wheel to be driven.
7. Dummy Shaft. This supports the electric motor 1 and the not driven wheel opposite the drive wheel in the one wheel drive embodiments.
8. Standard Internal Combustion Engine. This is the engine that comes standard with most vehicles today. The system of the present invention does not connect to the existing power train.
9. Support Brackets. These well allow the system of the present invention to be installed to existing standard vehicle mounting brackets.
10. Brakes. These can be easily connected to existing brake lines.
11. Axle Assembly. This element is configured to replace, both structurally and functionally, the existing unpowered rear axle of a front-wheel drive automobile.
12. Rear Wheel. This is a first rear wheel of a front-wheel drive automobile.
13. Variable-resistance switch 13. This allows the electric motor to be controlled by the driver, optionally through the existing gas pedal 14 and/or the existing shift lever 15.
14. Gas Pedal. This is the existing gas pedal.
15. Shift Lever. This is the existing shift lever, whether an automatic or manual transmission is used.

The present invention comprises a rechargeable automobile electric power system. The invention includes an electric motor 1 that is powered by rechargeable batteries 2. The electric motor 2 may be attached to an axle assembly 11 in line with the two rear wheels 12 driving one or both of them.

The power unit containing the rechargeable batteries 2 may come as a complete assembly with breaks 10 for easy installation. The system can be added to any front-wheel drive vehicle. This is designed to give any vehicle two separate and different engines. One is the standard internal combustion engine 8 powered generally by gasoline or diesel. The other source is rechargeable electric power. Preferably, this system may be used in front-wheel drive cars. The idea behind the electric power is generally for city driving or other driving where the vehicle is travelling less than about 40 miles per hour. Also, a high powered electric motor may be included allowing use of the electric motor for higher speeds or where more torque is needed.

As discussed in the background, while it would take years to justify the purchase of a hybrid vehicle through gas savings, adding electric power to an existing front-wheel drive vehicle according to the present invention today will pay for its self in a short time. The cost of purchasing and installing the system of the present invention is expected to be a small fraction of the cost to purchase a new hybrid vehicle.

The electric motor 1 can come in different shapes and sizes that will be determined by the weight and design of the vehicle. The level of horse power of this electric motor 1 can also be varied widely in accordance with the present invention. A standard bolt pattern to attach a clutch system and axle housing 3 may be included. The axle housing 3 will probably be the place where most design variations will be in order to fit different models of vehicles.

A clutch system could be used if a two wheel drive unit is desired.

The axle assembly 11 may be of in different lengths contain different lug bolt patterns to fit the model of vehicle.

The suspension system on some existing automobiles may be effective enough to withstand the added weight of the batteries 2. It is estimated that the rechargeable batteries 2 may weigh anywhere from about 100 to about 200 pounds. Optionally, alterations to the suspension system because of the torque put out by the electric motor 1 may be made. Mounting brackets for the suspension may be attached to the axle housing 3 with different brackets for the different models. Most front-wheel drive cars have leaf springs for the rear axle. The addition of leafs and attaching brackets may also help with the added weight of the battery pack.

This electric motor could also be coupled with a generator in such a way that while the vehicle is in operation using the gas motor, the electric motor 1 can be used to charge the battery pack up. A potential drawback of this embodiment would be additional fuel consumption. Given the increased fuel prices, recharging the batteries by plugging them into a power outlet may be a cheaper option. Optionally also, the system of the present invention may include one or more solar panels coupled with the one or more rechargeable batteries.

One of the main advantages of this electric motor system is that it can be installed an existing front-wheel drive vehicle. It is estimated that in one year gas will be $7.00 a gallon. This could almost make automobiles obsolete given the level of fuel-efficiency of most automobiles today. However, a system capable of providing drastically limited fuel consumption for city driving, without the cost of a new car, could restore the freedom of driving that many have grown accustomed to. Another advantage of the system of the present invention is that it would add 4-wheel drive capability for emergency, recreational, or other use to an existing 2-wheel drive vehicle.

The system of the present invention is designed as a unit meant to replace the rear axle of a front-wheel drive vehicle. The system comprises: an axle assembly 11 configured to replace the existing unpowered rear axle of a front-wheel drive automobile. It also includes an electric motor and one or more rechargeable batteries configured to supply power to the electric motor. The electric motor is further configured to drive at least one of the rear wheels of the front-wheel drive automobile.

Optionally, the present invention may include a variable-resistance switch 13 13, the switch being coupled to a gas pedal 14 of the front-wheel drive automobile such that the electric motor is engaged and controlled by the gas pedal 14 when the variable-resistance switch 13 13 is on, and the electric motor is disengaged and ceases to be controlled by the gas pedal 14 when the variable-resistance switch 13 is off. The switch could be configured to engage the electric motor 1 in order to engage both the motor and the existing internal combustion engine 8. One of ordinary skill in the art would recognize numerous methods by which this coupling could be accomplished. Two optional example designs follow. One is a solenoid that will switch the gas pedal 14 back and forth from gas to electric. By doing this one could then put an "E" for "electric power" where the "N" is on your gear shift. By placing the gear shift in neutral this would engage the electric motor. At the same time, this would disengage the gas system, as a gas engine is disengaged when the gear shift is shifted into neutral. If faster speeds or additional power is needed the vehicle could be shifted into drive thereby engaging the existing internal combustion engine at the same time as the electric motor of the system is also engaged. Another optional design would be a small and separate switch on the floor next to the gas pedal 14.

The system may also include brakes 10 coupled with the axle assembly 11 and configured to connect to an existing brake line of the front-wheel drive automobile.

The rechargeable batteries 2 may be recharged in numerous ways known to one of ordinary skill in the art, such methods which may be utilized individually or in combination with one another. Maximum fuel efficiency would likely be obtained by recharging via an electric power outlet. This system could also optionally include one or more solar panels configured to recharge the rechargeable batteries.

The electric motor 1 may also be coupled to the axle assembly 11 through a one-way clutch, allowing the electric motor to disengage the electric motor to coast when not in use. The axle assembly 11 may optionally be designed in the following manner. It may include a drive axle 5 extending from the electric motor 1 and connecting to a first rear wheel; an axle housing 3 supporting the drive axle 5; and a dummy shaft 7 extending from the electric motor to a second rear wheel where the electric motor is configured to only drive one wheel. Alternatively, a second drive axle extending from the electric motor to a second rear wheel may be included allowing the electric motor 1 to drive both wheels. In a further potential design, the axle housing 3 may be hollow and extend from the electric motor 1 to a hub of the first rear wheel.

In an alternative embodiment, the present invention comprises a modifying a front-wheel drive automobile comprising:
a. removing a rear axle of the front-wheel drive automobile;
b. installing a rechargeable automobile electric power system in place of the rear axle;
c. connecting a wheel to each end of the rechargeable automobile electric power system; wherein the rechargeable automobile electric power system comprises the system described above.

The method may further include the installation of a variable-resistance switch 13, the variable-resistance switch 13 being coupled to a gas pedal 14 of the front-wheel drive automobile such that the electric motor is engaged and controlled by the gas pedal 14 when the variable-resistance switch 13 is on, and the electric motor is disengaged and ceases to be controlled by the gas pedal 14 when the variable-resistance switch 13 is off. The variable-resistance switch 13 may also be configured to turn on when the front-wheel drive automobile is shifted into neutral and switch off when the front-wheel drive automobile is shifted out of neutral.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A rechargeable automobile electric power system, comprising:
   (A) an axle assembly; wherein the axle assembly is configured to replace an existing unpowered rear axle of a front-wheel drive automobile;
   (B) an electric motor;
   (C) one or more rechargeable batteries configured to supply power to the electric motor; wherein the electric motor is further configured to drive at least one of the rear wheels of the front-wheel drive automobile
   (D) a drive axle extending from the electric motor and connecting to a first rear wheel;
   (E) an axle housing supporting the drive axle;
   (F) a dummy shaft extending from the electric motor to a second rear wheel.

2. The rechargeable automobile electric power system of claim 1 wherein the axle housing is hollow and extends from the electric motor to a hub of the first rear wheel.

\* \* \* \* \*